United States Patent
Cho

(10) Patent No.: US 11,392,310 B2
(45) Date of Patent: Jul. 19, 2022

(54) MEMORY SYSTEM AND CONTROLLER

(71) Applicant: SK hynix Inc., Icheon (KR)

(72) Inventor: Hungyung Cho, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/904,039

(22) Filed: Jun. 17, 2020

(65) Prior Publication Data

US 2021/0132848 A1     May 6, 2021

(30) Foreign Application Priority Data

Oct. 31, 2019    (KR) ........................ 10-2019-0137531

(51) Int. Cl.
*G06F 3/00*     (2006.01)
*G06F 3/06*     (2006.01)

(52) U.S. Cl.
CPC .......... *G06F 3/0647* (2013.01); *G06F 3/0604* (2013.01); *G06F 3/064* (2013.01); *G06F 3/0652* (2013.01); *G06F 3/0673* (2013.01)

(58) Field of Classification Search
CPC .... G06F 3/0647; G06F 3/0604; G06F 3/0673; G06F 3/064; G06F 3/0652; G06F 12/0246; G06F 3/065; G06F 3/0619; G06F 3/061; G06F 3/0679; G06F 3/0658; G06F 3/0614; G06F 3/0626; G06F 3/0659
See application file for complete search history.

(56) References Cited

U.S. PATENT DOCUMENTS

| | | | | |
|---|---|---|---|---|
| 4,638,472 | A * | 1/1987 | Ogata | G11B 20/1816 360/25 |
| 7,577,787 | B1 * | 8/2009 | Yochai | G06F 12/0804 711/113 |
| 10,175,891 | B1 * | 1/2019 | Malwankar | G06F 3/0656 |
| 10,748,589 | B1 * | 8/2020 | Yamada | G06F 13/1689 |
| 2006/0161724 | A1 * | 7/2006 | Bennett | G06F 12/0246 711/E12.008 |
| 2008/0052478 | A1 * | 2/2008 | Kubo | G06F 3/0689 711/162 |
| 2009/0044190 | A1 * | 2/2009 | Tringali | G06F 13/1689 718/102 |

(Continued)

FOREIGN PATENT DOCUMENTS

| | | |
|---|---|---|
| KR | 1020150110918 A | 10/2015 |
| KR | 1020160016421 A | 2/2016 |

(Continued)

*Primary Examiner* — Craig S Goldschmidt

(57) ABSTRACT

A memory system includes a memory device including a plurality of memory blocks, and a controller for controlling the memory device. The controller stores user data in an original block selected among the memory blocks. When the original block becomes a closed block, the controller generates a copy block by copying each page of the original block into a page having the same page address of a free block among the memory blocks, and stores map data associated with the user data in the memory device, the map data including a logical address of the user data, an address of the original block, an address of the copy block, and a common page address. The common page address is a page address which is in common in the original block and the copy block. In embodiments, the controller limits the number of copy blocks according to a configurable copy level.

20 Claims, 9 Drawing Sheets

MAP TABLE /-500

| LOGICAL ADDR | PHYSICAL ADDR | | |
|---|---|---|---|
| | ORIGINAL BLOCK | COPY BLOCK | (COMMON) PAGE |
| LBA1 | BLOCK1 | - | PAGE1 |
| LBA2 | BLOCK1 | - | PAGE2 |
| LBA3 | BLOCK1 | - | PAGE3 |
| LBA4 | BLOCK5 | - | PAGE1 |
| LBA5 | BLOCK5 | - | PAGE2 |
| LBA6 | BLOCK2 | BLOCK4 | PAGE2 |
| LBA7 | BLOCK2 | BLOCK4 | PAGE3 |
| LBA8 | BLOCK2 | BLOCK4 | PAGE4 |
| LBA9 | BLOCK3 | BLOCK7 | PAGE3 |
| LBA10 | BLOCK3 | BLOCK7 | PAGE1 |
| LBA11 | BLOCK3 | BLOCK7 | PAGE1 |
| LBA12 | BLOCK5 | - | PAGE3 |
| ... | ... | ... | ... |

(56) References Cited

U.S. PATENT DOCUMENTS

| | | | |
|---|---|---|---|
| 2010/0318726 A1* | 12/2010 | Watanabe | G06F 12/0246 711/103 |
| 2011/0191554 A1* | 8/2011 | Sakai | G06F 3/0689 711/162 |
| 2020/0241798 A1* | 7/2020 | Kanno | G06F 3/0679 |

FOREIGN PATENT DOCUMENTS

| KR | 101647845 B1 | 8/2016 |
|---|---|---|
| KR | 1020190032839 A | 3/2019 |

* cited by examiner

FIG. 3

|  | BLOCK1 | BLOCK2 | BLOCK3 | BLOCK4 | BLOCK5 |
|---|---|---|---|---|---|
| PAGE1 | LBA1 | INVALID | LBA9 | INVALID | LBA4 |
| PAGE2 | LBA2 | LBA6 | LBA10 | LBA6 | LBA5 |
| PAGE3 | LBA3 | LBA7 | LBA11 | LBA7 | LBA12 |
| PAGE4 | INVALID | LBA8 | INVALID | LBA8 |  |

|  | BLOCK6 | BLOCK7 | BLOCK8 | BLOCK9 | BLOCK10 |
|---|---|---|---|---|---|
| PAGE1 |  | LBA9 |  |  |  |
| PAGE2 |  | LBA10 |  |  |  |
| PAGE3 |  | LBA11 |  |  |  |
| PAGE4 |  | INVALID |  |  |  |

150

COPY LEVEL : 2

FIG. 4

| COPY LEVEL | COPY RATE | CAPACITY (HOST SIDE) |
|---|---|---|
| LV1 | 0% | 100% |
| LV2 | 20% | 80% |
| LV3 | 33.3% | 66.7% |
| LV4 | 50% | 50% |

REMOVE ALL USER DATA ⬇

⬆ DON'T REMOVE ORIGINAL DATA

FIG. 5

MAP TABLE (500)

| LOGICAL ADDR | PHYSICAL ADDR | | (COMMON) PAGE |
| --- | --- | --- | --- |
| | ORIGINAL BLOCK | COPY BLOCK | |
| LBA1 | BLOCK1 | - | PAGE1 |
| LBA2 | BLOCK1 | - | PAGE2 |
| LBA3 | BLOCK1 | - | PAGE3 |
| LBA4 | BLOCK5 | - | PAGE1 |
| LBA5 | BLOCK5 | - | PAGE2 |
| LBA6 | BLOCK2 | BLOCK4 | PAGE2 |
| LBA7 | BLOCK2 | BLOCK4 | PAGE3 |
| LBA8 | BLOCK2 | BLOCK4 | PAGE4 |
| LBA9 | BLOCK3 | BLOCK7 | PAGE3 |
| LBA10 | BLOCK3 | BLOCK7 | PAGE1 |
| LBA11 | BLOCK3 | BLOCK7 | PAGE1 |
| LBA12 | BLOCK5 | - | PAGE3 |
| ... | ... | ... | ... |

MEMORY SYSTEM AND CONTROLLER

CROSS-REFERENCE TO RELATED APPLICATIONS

The present application claims priority of Korean Patent Application No. 10-2019-0137531, filed on Oct. 31, 2019, which is incorporated herein by reference in its entirety.

BACKGROUND

1. Field

Illustrative embodiments of the present invention relate to a memory system and a controller for controlling a memory device.

2. Description of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Embodiments of the present invention are directed to a memory system and a controller capable of adjusting the capacity of the memory system and the reliability of data stored in the memory system according to the selection of a host.

Embodiments of the present invention are directed to a memory system and a controller capable of ensuring the reliability of data stored in the memory system at a low management cost.

Embodiments of the present invention are directed to a memory system and a controller capable of reducing read disturbance of data stored in the memory system.

In accordance with an embodiment of the present invention, a memory system includes: a memory device including a plurality of memory blocks; and a controller configured to control the memory device, wherein the controller stores user data in an original block selected among the memory blocks, and when the original block becomes a closed block, generates a copy block by copying data of each page of the original block into a page having the same page address of a free block among the memory blocks, and stores map data associated with the user data in the memory device, wherein the map data include a logical address of the user data, an address of the original block, an address of the copy block, and a common page address, and wherein the common page address is a page address which is in common in the original block and the copy block.

In accordance with another embodiment of the present invention, a controller for controlling a memory device includes: a processor configured to store user data in an original block of the memory device, and when the original block becomes a closed block, generating a copy block by copying data of each page of the original block into a page having the same page address of a free block among free blocks of the memory device; and a memory configured to store map data that include a logical address of the user data, an address of the original block, an address of the copy block, and a common page address, wherein the common page address is a page address which is in common in the original block and the copy block.

BRIEF DESCRIPTION OF THE DRAWINGS

FIG. 3 illustrates a plurality of memory blocks included in a memory device in accordance with an embodiment of the present invention.

FIG. 4 illustrates a copy level in accordance with an embodiment of the present invention.

FIG. 5 illustrates map data in accordance with an embodiment of the present invention.

DETAILED DESCRIPTION

Figure 1:
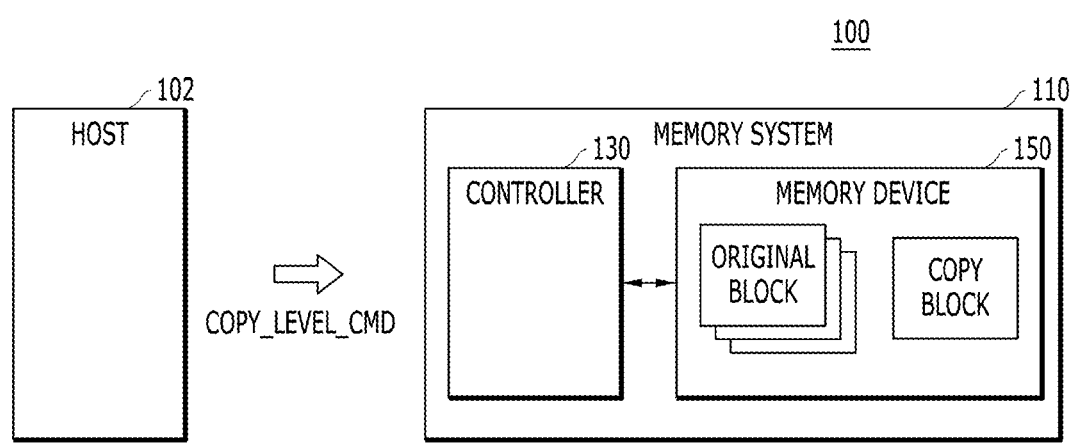
FIG. 1 is a block diagram illustrating a data processing system including a memory system in accordance with an embodiment of the present invention.

Illustrative embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Hereinafter, embodiments of the present invention will be described in more detail with reference to the accompanying drawings.

FIG. 1 is a block diagram illustrating a data processing system 100 including a memory system 110 in accordance with an embodiment of the present invention.

Referring to FIG. 1, the data processing system 100 may include a host 102 operatively coupled to the memory system 110.

The host 102 may include any of various portable electronic devices such as a mobile phone, MP3 player, and laptop computer, or any of various non-portable electronic devices such as a desktop computer, a game machine, a television (TV), and a projector.

The host 102 may include at least one operating system (OS), which may manage and control overall functions and operations of the host 102, and provide for communication between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request of the host 102. Non-limiting examples of the memory system 110 may include a solid state drive (SSD), a multi-media card (MMC), a secure digital (SD) card, a universal storage bus (USB) device, a universal flash storage (UFS) device, a compact flash (CF) card, a smart media card (SMC), a personal computer memory card international association (PCMCIA) card, and a memory stick. The MMC may include an embedded MMC (eMMC), reduced size MMC (RS-MMC) and micro-MMC, or the like. The SD card may include a mini-SD card or micro-SD card.

The memory system 110 may be embodied by various types of storage devices. Examples of such storage devices may include, but are not limited to, volatile memory devices (such as dynamic random access memory (DRAM) and static RAM (SRAM)) and nonvolatile memory devices (such as read only memory (ROM), mask ROM (MROM), programmable ROM (PROM), erasable programmable ROM (EPROM), electrically erasable programmable ROM (EEPROM), ferroelectric RAM (FRAM), phase-change RAM (PRAM), magneto-resistive RAM (MRAM), resistive RAM (RRAM or ReRAM), and flash memory). The flash memory may have a 3-dimensional (3D) stack structure.

The memory system 110 may include a controller 130 and a memory device 150. The memory device 150 may store data for the host 102, and the controller 130 may control storage of data in the memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. In another example, the controller 130 and the memory device 150 may be integrated as one semiconductor device to constitute a memory card, such as a PCMCIA card, CF card, SM card, memory stick, MMC, SD card, SDHC card, or UFS device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even when power is not supplied. The memory device 150 may store data provided from the host 102 through a program operation, and provide data stored therein to the host 102 through a read operation. The memory device 150 may include a plurality of memory blocks each of which may include a plurality of pages, and each of the pages may include a plurality of memory cells coupled to a word line. In an embodiment, a memory block corresponds to cells that are always erased together by an erase operation, and a page corresponds to cells that are programmed together by a program operation. In an embodiment, the memory device 150 may be a flash memory. The flash memory may have a 3-dimensional (3D) stack structure.

In an embodiment of the present invention, the memory device 150 is a non-volatile memory, such as a flash memory, e.g., a NAND flash memory. However, the memory device 150 may include any of a Phase Change Random Access Memory (PCRAM), a Resistive Random Access Memory (RRAM or ReRAM), a Ferroelectric Random Access Memory (FRAM), a Spin Transfer Torque Magnetic Random Access Memory (STT-RAM or STT-MRAM), and the like.

The controller 130 may control the memory device 150 in response to a request from the host 102. For example, the controller 130 may provide data read from the memory device 150 to the host 102, and store data provided from the host 102 into the memory device 150. To perform these operations, the controller 130 may control read, program, erase, and other operations of the memory device 150.

The controller 130 may store data in the memory device 150 in response to a request from the host 102. The controller 130 may store original data and copy data in the memory device 150 based on user data provided from the host 102. When the controller 130 stores the original data and the copy data in the memory device 150, if one of the original data and the copy data is damaged, the other one may be undamaged, thereby providing a reliable memory system 110 to the host 102.

When the memory device 150 stores the original data and the copy data for all user data, the capacity of the memory system 110 available to the host 102 may be about half of the actual capacity of the memory device 150. When the controller 130 separately performs a first mapping between a logical address of the user data and the physical location where the original data is stored and a second mapping between the logical address and the physical location where the copy data is stored, a large amount of map data (almost as much as the amount required when the host 102 stores the data corresponding to the actual capacity of the memory device 150) may be required.

According to an embodiment of the present disclosure, the memory system 110 may store copy data for all or part of user data stored in the memory system 110. For example, the controller 130 may determine a copy level indicating how much copy data may be stored in the memory device 150 in response to a copy level setting command COPY_LEVEL_CMD which is provided from the host 102. For example, the controller 130 may not store copy data when the copy level is the lowest, may store copy data for all original data when the copy level is the highest, and may store copy data for a limited amount of original data when the copy level is medium. Therefore, it may be possible to strike a balance between the capacity and the reliability of the memory system 110 according to the selection of the host 102.

According to an embodiment of the present disclosure, the controller 130 may generate a copy block by copying data of each page of an original block into a page having the same page address of a free block. The original block may refer to a memory block in which user data are stored as original data. The copy block may refer to a memory block in which the original data are copied and stored as copy data. The same data may be stored in the pages of the original block and the copy block having the same page address and corresponding to each other.

The controller 130 may designate both of the physical address of the original data and the physical address of the copy data by designating an original block address of the user data, a copy block address, and a common page address. The common page address may refer to a page address which is in common in the original block and the copy block. The page address of each page may be relative to the beginning of the memory block that includes the page. Since the same data are stored in the pages having the same page address in the original block and the copy block that correspond to each other, the controller 130 may not have to separately designate the page address for the original data and the page address for the copy data corresponding to the original data in order to specify the physical address of the original data and the physical address of the copy data. Therefore, the size of the map data stored in the memory device 150 may be reduced compared to, for example, the map size required when the host 102 stores data corresponding to the actual capacity of the memory device 150.

According to an embodiment of the present disclosure, the controller 130 may alternate between accessing the original data and accessing the copy data when responding to successive read commands for the same logical address. Accordingly, when the host 102 repeatedly reads the same logical address, it is possible to prevent a read operation from being intensively performed in one memory block by alternately accessing the original data and the copy data. Thus, read disturbance of the memory device 150 may be prevented.

According to an embodiment of the present disclosure, the controller 130 may access one of the original data and the copy data in response to a read request from the host 102, and when the accessed data damaged, the controller 130 may provide the host 102 with the other of the original data and the copy data which remains undamaged. The controller 130 may be able to recover the damaged data based on the other data.

Figure 2:
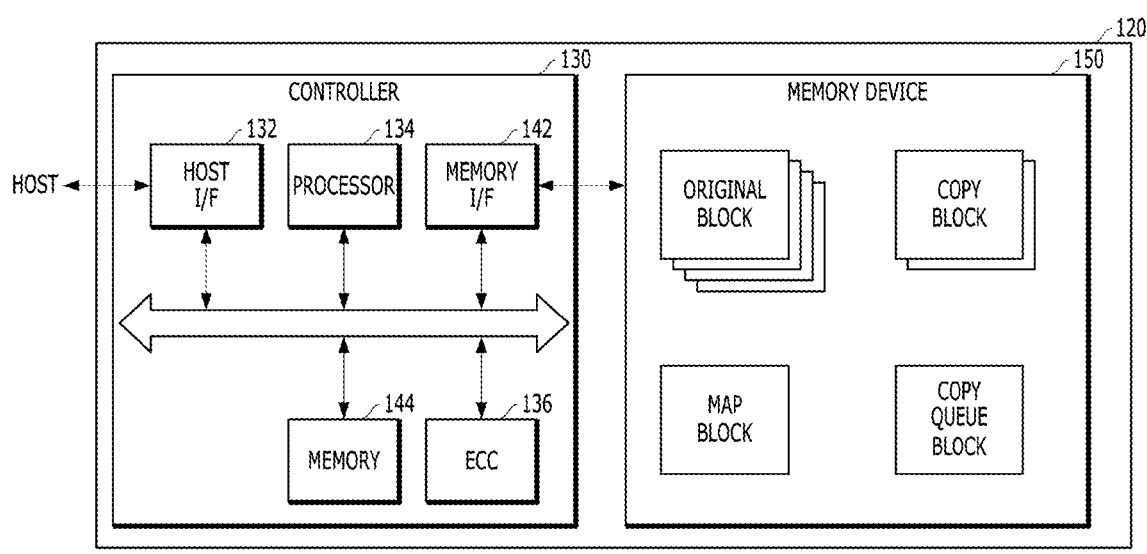
FIG. 2 is a block diagram illustrating a memory system in accordance with an embodiment of the present invention.

FIG. 2 is a block diagram illustrating the memory system 110 in detail in accordance with an embodiment of the present invention.

The memory system 110 may include a memory device 150 and a controller 130. The memory device 150 and the controller 130 illustrated in FIG. 2 may correspond to the memory device 150 and the controller 130 illustrated in FIG. 1.

The controller 130 may include a host interface (I/F) 132, a processor 134, an error correction code (ECC) component 136, a memory I/F 142, and a memory 144 all operatively coupled via an internal bus.

The host I/F 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI), and integrated drive electronics (IDE).

The host I/F 132 may be driven through firmware referred to as a host interface layer (HIL) in order to exchange data with the host. In an embodiment, the HIL firmware may be executed by the processor 134.

The memory I/F 142 may serve as a memory/storage interface for interfacing the controller 130 and the memory device 150 so that the controller 130 may control the memory device 150 in response to a request from the host 102. When the memory device 150 is a flash memory or specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. For example, the memory I/F 142 may support data transfer between the controller 130 and the memory device 150.

The memory I/F 142 may be driven through firmware referred to as a flash interface layer (FIL) in order to exchange data with the memory device 150. In an embodiment, the FIL firmware may be executed by the processor 134.

The ECC component 136 may detect and correct an error contained in the data read from the memory device 150. In other words, the ECC component 136 may perform an error correction decoding process on the data read from the memory device 150 using an ECC value generated during an ECC encoding process. According to a result of the error correction decoding process, the ECC component 136 may output a signal, for example, an error correction success/fail signal. When the number of error bits is more than a threshold value of correctable error bits, the ECC component 136 may not correct the error bits, and may output an error correction fail signal.

The memory 144 may serve as a working memory of the memory system 110 and the controller 130, and store data for driving the memory system 110 and the controller 130. The controller 130 may control the memory device 150 to perform read, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The memory 144 may temporarily store data for performing an operation such as a write operation and a read operation between the host 102 and the memory device 150. For example, a memory 144 may temporarily store user data that are exchanged between the host 102 and the memory device 150. As another example, the memory 144 may temporarily store at least a portion of data among the data of a map block and the data of a copy queue block, which will be described later, to perform a write operation and a read operation.

The processor 134 may control the overall operations of the memory system 110. The processor 134 may drive firmware to control the overall operations of the memory system 110. The firmware may be referred to as flash translation layer (FTL). Also, the processor 134 may be realized as a microprocessor or a central processing unit (CPU).

For example, the controller 130 may perform an operation requested by the host 102 through the processor 134. In other words, the controller 130 may perform a command operation corresponding to a command received from the host 102. The controller 130 may perform a foreground operation as the command operation corresponding to the command received from the host 102. For example, the controller 130 may perform a program operation corresponding to a write command, a read operation corresponding to a read command, an erase operation corresponding to an erase command, and a parameter set operation corresponding to a set parameter command or a set feature command.

Also, the controller 130 may perform a background operation on the memory device 150 through the processor 134. For example, the background operation performed on the memory device 150 may include a garbage collection (GC) operation, a wear-leveling (WL) operation, a map flush operation, or a bad block management operation.

The memory device 150 may store user data provided from the host 102, metadata about the user data, and system data for driving the memory system 110 in a plurality of memory blocks. FIG. 2 illustrates original blocks, copy blocks, a map block, and a copy queue block among the memory blocks. The number of each kind of the blocks shown in FIG. 2 is only an illustrative example, and embodiments are not limited thereto.

An original block may store user data as original data. A copy block may store copy data obtained by copying at least a portion of the original data according to a copy rate. The number of copy blocks may be less than or equal to the number of original blocks. Some original blocks may have corresponding copy blocks, and the other original blocks may not have corresponding copy blocks. An original block and the corresponding copy block may store the same data. A page of a copy block having the same page address as a particular page of an original block may store the same data as that page of the original block. An example of the memory device 150 that stores the original data of user data and at least a portion of the copy data will be described below with reference to FIG. 3.

The map block may store a map table including one or more entries corresponding to map data of the user data. For example, the map data may include a logical address of the user data, an original block address, a copy block address, and a common page address. Each logical address may correspond to an amount of data that can be stored in one page of the memory device 150. An example of the map data will be described later with reference to FIG. 5.

The copy queue block may store a copy queue for maintaining the number of original blocks and the number of copy blocks according to the copy level of the memory system 110. An example of the copy queue block is described below with reference to FIG. 6, and an example of the copy level is described below with reference to FIG. 4.

FIG. 3 illustrates a plurality of memory blocks included in the memory device 150 in accordance with an embodiment of the present invention.

FIG. 3 illustrates a case having ten memory blocks BLOCK1 to BLOCK10 capable of storing user data, where each block respectively includes four pages PAGE1 to PAGE4, but embodiments are not limited thereto. In the example of FIG. 3, the map block and the copy queue block are omitted. A patterned area may represent a page in which data are stored, and a blank area may represent a page in an erase state. The page in which data are stored may store valid data or invalid data. An area in which 'INVALID' is written may represent a page in which invalid data is stored, and an area in which a logical address (LBA) is written may represent a page in which valid data corresponding to the logical address is stored.

In the example of FIG. 3, the memory device 150 is using two memory blocks among the ten memory blocks (in the example, Block 4 and Block 7) as copy blocks according to a copy level.

FIG. 4 illustrates a copy level in accordance with an embodiment of the present invention.

The table of FIG. 4 illustrates the copy rate and capacity according to the copy level. The copy rate may indicate the fraction of the capacity of the user data storage space of the memory device 150 that may be used to store copy data. The capacity may indicate the fraction of the capacity of the user data storage space of the memory device 150 of the memory system 110 that may be used by the host 102. Typically, the space occupied by system data and metadata in the storage space of the memory device 150 is small, and most of the storage space of the memory device 150 may be used to store user data.

The host 102 may determine the copy level of the memory system 110 by using a copy level setting command. Each copy level corresponds to a different compromise between the capacity of the memory system 110 and the reliability of the data stored in the memory system 110, and the copy level may be selected according to the purpose the memory system 110 is being used for. In the example of FIG. 4, the host 102 may set the copy level to any one among first to fourth levels LV1 to LV4, but embodiments are not limited thereto.

When the copy level is the first level, the memory system 110 may not store copy data at all. The host 102 may use a storage space corresponding to the entire capacity of the user data storage space of the memory device 150.

When the copy level is the second level, the memory system 110 may store copy data in up to approximately 20% of the user data storage space of the memory device 150. The host 102 may use a storage space corresponding to approximately 80% of the capacity of the memory device 150. When the storage space occupied by the original data exceeds approximately 20% of the user data storage space and if copy data was stored for all the original data in the memory device 150, the storage space occupied by the copy data would exceed approximately 20%. Therefore, the memory system 110 may store copy data only for a portion of the original data. For example, when the amount of the original data exceeds approximately 20% of the user data storage space, the memory system 110 may remove the oldest copy data from among the copy data.

When the copy level is the third level, the memory system 110 may store the copy data in up to approximately 33.3% of the user data storage space of the memory device 150. The host 102 may use approximately 66.7% of the capacity of the memory device 150. When the original data occupy approximately 33.3% or more of the storage space of the memory device 150, the memory system 110 may store the copy data only for a portion of the original data.

When the copy level is the fourth level, the memory system 110 may store the copy data in up to the maximum 50% of the user data storage space of the memory device 150. The host 102 may use approximately 50% of the capacity of the memory device 150. Since the original data occupy approximately 50% or less in the memory device 150, the memory system 110 may store the copy data for all the original data.

The arrows shown in the graph of FIG. 4 are for explaining the change of the copy level.

The host 102 may change the capacity and reliability level of the memory system 110 by using a copy level setting command and changing the copy level of the memory system 110.

When the copy level of the memory system 110 changes from a present level to a higher level, the host 102 may lose the user data of the memory system 110 because the storage space available to the host 102 is reduced. According to one embodiment of the present invention, when the host 102 issues a command for setting the copy level of the memory system 110 to a higher level than the existing level, the memory system 110 may remove all the user data and change the copy level.

When the copy level of the memory system 110 changes from a present level to a lower level, the storage space available to the host 102 in the memory device 150 may increase. When the host 102 issues a command for setting the copy level of the memory system 110 to a lower level than the existing level, the memory system 110 may change the copy level without removing any original data. Since the storage space for storing the copy data in the memory device 150 may be reduced, the memory system 110 may remove some copy data if necessary.

Referring back to FIG. 3, pages of the second memory block BLOCK2 and the fourth memory block BLOCK4 having the same page address may store the same data. For example, the second memory block BLOCK2 may be an original block and the fourth memory block BLOCK4 may be a corresponding copy block. Similarly, the third memory block BLOCK3 may be an original block and the seventh memory block BLOCK7 may be a copy block so that among the third and seventh memory blocks BLOCK3 and BLOCK7, pages having the same page address store the same data.

A memory block that stores the same data as the first memory block BLOCK1 (that is, a copy block corresponding to original block BLOCK1) may not exist in the memory device 150. For example, if the first memory block BLOCK1 is older than the second memory block BLOCK2 and the third memory block BLOCK3, and the number of the copy blocks is limited to two, the data of a copy block corresponding to the first memory block BLOCK1 may have been removed as described with respect to FIG. 6, below.

The fifth memory block BLOCK5 may be an open block in which not all the pages have been programmed with data. The processor 134 may determine one among the free blocks, which are memory blocks in which all pages are erased such as blocks BLOCK6, BLOCK5, BLOCK9, and BLOCK 10, as an open block in order to store data in the memory device 150. When data are programmed in all the pages of the open block, the processor 134 may change the open block into a closed block and may not store any additional data into the closed block.

According to an embodiment of the present invention, when an open block is changed to a closed block, the processor 134 may generate a copy block of the newly-closed memory block. In the example of FIG. 3, since the fifth memory block BLOCK5 is an open block, a copy block corresponding to the fifth memory block BLOCK5 may not exist in the memory device 150.

FIG. 5 illustrates map data in accordance with an embodiment of the present invention.

FIG. 5 illustrates a map table 500 in which map data are stored as entries in a table structure. The map data illustrated in FIG. 5 may represent the relationship between a plurality of memory blocks and logical addresses illustrated in FIG. 3. The map table 500 may include information on a physical address corresponding to each logical address.

When original data and copy data corresponding to a logical address are both stored in the memory device 150, the physical address portion of the map data for the logical address may include an original block address, a copy block address, and a common page address. For example, the user data associated with the sixth logical address LBA6 may be stored in a second page PAGE2 of the second memory block BLOCK2, which is the original block, and a second page PAGE2 of the fourth memory block BLOCK4, which is a copy block. The second page PAGE2 may be a page in which the user data are stored in common in the original block and the copy block. Accordingly, as shown in FIG. 5, the physical address portion of the map data corresponding to the sixth logical address LBA6 may include addresses of the second memory block BLOCK2, the fourth memory block BLOCK4, and the second page PAGE2.

When only the original data corresponding to a logical address is stored in the memory device 150, the physical address portion of the map data corresponding to the logical address may include an original block address and a page address, and in an embodiment does not include a valid copy block address. For example, the user data associated with the first logical address LBA1 may be stored in the first page PAGE1 of the first block BLOCK1, which is an original block. The copy data of the user data may not exist in the memory device 150. Therefore, the physical address portion of the map data corresponding to the first logical address LBA1 may include an address of the first block BLOCK1 and the first page PAGE1, as shown in FIG. 5.

Figure 6:
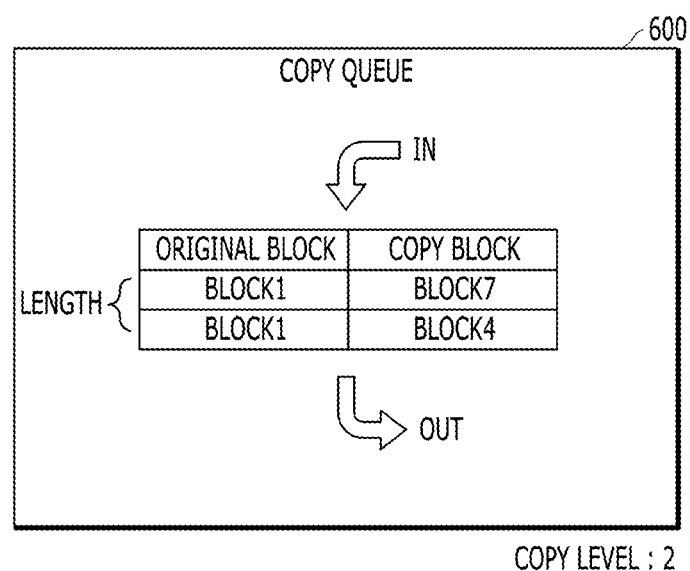
FIG. 6 illustrates a copy queue in accordance with an embodiment of the present invention.

FIG. 6 illustrates a copy queue 600 in accordance with an embodiment of the present invention.

The copy queue 600 may store entries including information about a copy block and a corresponding original block in a First-In-First-Out (FIFO) structure. The information about originals block and copy blocks shown in FIG. 6 may correspond to the original blocks and the copy blocks in FIG. 3.

When the copy level prevents the storage of copy data for all the user data in the memory device 150, the processor 134 may store the copy data of recently stored user data in the memory device 150 and remove old copy data from the memory device 150.

When data are stored in all pages of the original block, which was an open block, the processor 134 may change the original block from an open block to a closed block and queue the changed original block in the copy queue 600. The processor 134 may generate a copy block corresponding to the queued original block. According to an embodiment of the present invention, the processor 134 may generate the copy block during an idle state (such as when no commands from the host 102 are being processed) of the memory device 150. When a plurality of original blocks are changed to closed blocks before the memory device 150 goes to an idle state, the processor 134 may first queue all of the original blocks in the copy queue 600 and then when the memory device 150 is in an idle state, the processor 134 may generate a plurality of copy blocks corresponding to the original blocks.

As illustrated in FIG. 2, the copy queue 600 may be stored in a copy queue block of the memory device 150. A sudden power-off may occur in the memory system 110 before the processor 134 generates a copy block corresponding to the original block. When the memory system 110 is powered up after a sudden power-off, the processor 134 may load the copy queue 600 from the memory device 150 to determine whether the copy blocks corresponding to all the original blocks that are queued in the copy queue 600 have been generated or not. When there is an original block for which a corresponding copy block has not been generated, the processor 134 may generate the copy block corresponding to the original block.

When a new original block is queued in the copy queue 600 while the copy queue 600 is full, the queue entry for the oldest original block and the corresponding copy block may be removed from the copy queue 600. In the examples of FIGS. 3 and 6, when the fifth memory block BLOCK5 which is the original block is changed from an open block to a closed block, the processor 134 may input the fifth memory block BLOCK5 to the copy queue 600. When the fifth memory block BLOCK5 is inputted to the copy queue 600, the queue entry for the second memory block BLOCK2, which is the oldest original block, and the fourth memory block BLOCK4, which is a copy block corresponding to the second memory block BLOCK2, may be removed from the copy queue 600. The processor 134 may then generate a copy block corresponding to the fifth memory block BLOCK5 in the idle state.

The length LENGTH of the copy queue 600 may be determined based on the copy level. In the example of FIG. 3, since the memory device 150 may have up to two copy blocks according to the copy level, the copy queue 600 may have a length of 2. As another example, when the copy level is 4 and there are 10 memory blocks capable of storing user data, the memory device 150 may have a maximum number of 5 copy blocks, and thus the copy queue 600 may have a length of 5.

As illustrated in FIG. 2, the copy queue 600 may be stored in the memory device 150. Since the copy queue 600 is stored in the memory device 150, the copy block information may be maintained even after the memory system 110 is powered off.

Figure 7:
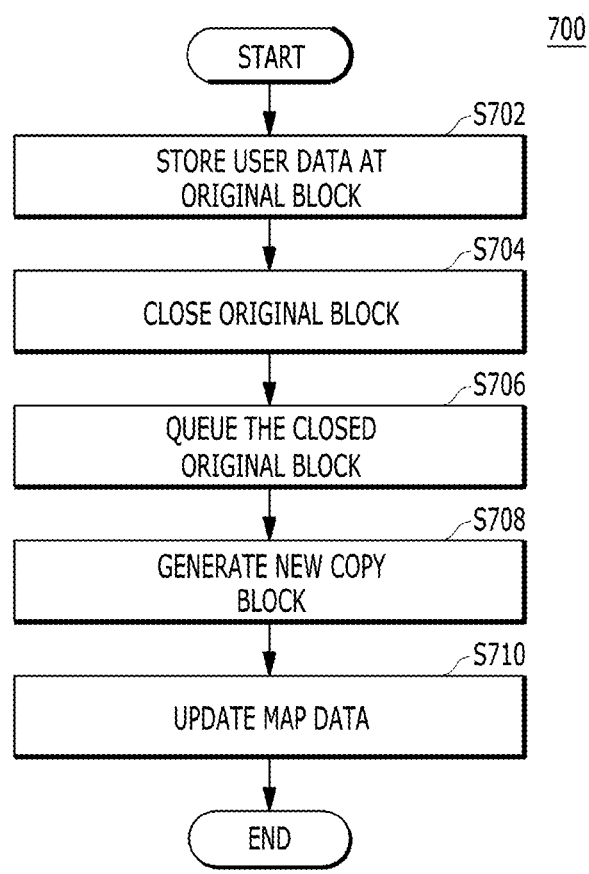
FIGS. 7, 8, and 9 are flowcharts describing an operation of a memory system in accordance with an embodiment of the present invention.

FIG. 7 is a flowchart describing an operation 700 of the memory system 110 in accordance with an embodiment of the present invention. In particular, FIG. 7 shows an operation 700 initiated by storing user data into the last unused page of an open original block.

In step S702, when the processor 134 receives user data from the host 102, the processor 134 may store the user data in an original block. For example, the processor 134 may control the memory device 150 to program the user data into an original block, which is an open block.

In step S704, when data are stored in all pages of the original block, the processor 134 may change the original block from the open block to a closed block.

In step S706, the processor 134 may newly queue the original block, which is the closed block, in a copy queue. When the copy queue is full before queuing the original block, the processor 134 may remove the entry corresponding to oldest original block and a copy block corresponding to the oldest original block from the copy queue. The copy data for the user data related to the original block removed from the copy queue may not have to be maintained any longer. Accordingly, the processor 134 may erase the removed copy block and make it a free block. Accordingly, in an embodiment the copy queue is used to manage the replacement policy (here, "replace oldest") used when copy blocks must be freed up for new data to use.

In step S708, the processor 134 may generate a new copy block. For example, the processor 134 may generate a new copy block by selecting one free block among the free blocks of the memory device 150, storing an address of the selected free block as the copy block address in the queue entry and map data associated with the original block, and copying the data of each page of the original block which is newly queued in the copy queue into a page of the selected free block having the same page address. When the processor 134 copies all the data of the original block into a copy block, the processor 134 may change the copy block into a closed block. Since the data of the original block is copied to generate a corresponding copy block, the same data may be stored in the pages having the same page address in the original block and the copy block corresponding to the original block.

According to an embodiment of the present invention, the processor 134 may perform the operation of the step S708 while the memory device 150 is in an idle state. The processor 134 may be able to improve reliability of data stored in the memory system 110 as well as preventing a response of the memory system 110 to a command of the host 102 from being delayed by performing an operation of generating the copy block in the idle state.

When an interruption occurs while the processor 134 is generating the copy block, after the generation of the copy block currently being generated is completed, a process to cope with the interruption may be performed and when there is a copy block that is not generated yet, the generation of the copy block may not be completed. When a plurality of interruptions and a plurality of copy block generation operations are in a race condition, the processor 134 may control the memory device 150 to alternately perform the operations on the interruptions and the copy block generation operations.

In step S710, the processor 134 may update map data. The processor 134 may update each map data having a logical address mapped into the original block to include the copy block address, and a common page address into the map data. For example, referring to FIG. 5, when in step S708 the fourth block BLOCK4 was made the copy block for the second block BLOCK2, at S710 the map data for logical addresses LBA6, LBA7, and LBA8 were updated to indicate a copy block address of BLOCK4. When an entry is removed from the copy queue, the processor 134 may remove the copy block address information from each of the map data associated with the block removed from the copy queue.

Figure 8:
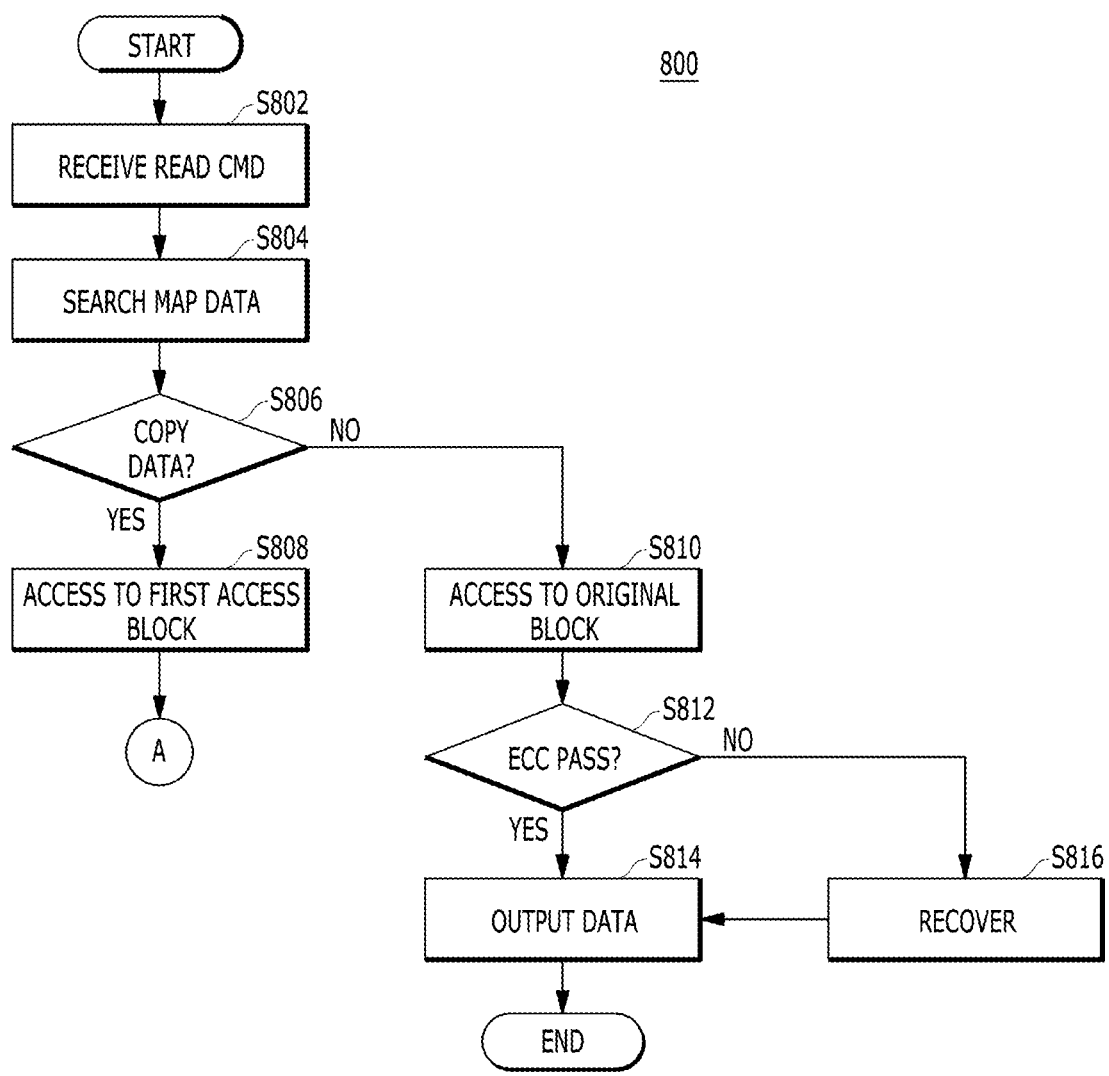

FIG. 8 is a flowchart describing an operation 800 of the memory system 110 in accordance with an embodiment of the present invention.

In step S802, the processor 134 may receive a read command and a read logical address associated with the read command from the host 102.

In step S804, the processor 134 may find map data associated with the read logical address.

In step S806, the processor 134 may determine whether there are copy data associated with the read logical address based on the map data. For example, when a copy block address is included in a physical address associated with the read logical address, the processor 134 may determine that there are copy data associated with the read logical address.

When there are no copy data associated with the read logical address ('No' in the step S806), the processor 134 may access the original block associated with the read logical address in step S810.

In step S812, an ECC 136 may detect and correct an error of the data that are read from the original block.

When error correction of the data is successful ('Yes' in the step S812), the host interface unit 132 may provide the error corrected data to the host 102 in step S814.

When the error correction of the data fails ('No' in the step S812), the processor 134 may perform a recovery operation such as a read retry in step S816. In the step S814, the host interface unit 132 may provide the host 102 with data that are recovered by the recovery operation.

When there are copy data associated with the logical address ('Yes' in the step S806), the processor 134 may access one between the original block and the copy block that are associated with the read logical address in the step S808.

When the processor 134 accesses only the original block or only the copy block when the read logical address is repeatedly read, the data of the accessed memory block may be damaged due to read disturbance. According to an embodiment of the present invention, the processor 134 may alternately access the original block and the copy block whenever a read operation is performed for each logical address, so that, for example, for each logical address, a first read accesses the original block, a second read accesses the copy block, a third read accesses the original block, a fourth read accesses the copy block, and so on. Therefore, according to the embodiment of the present invention, read disturbance of a memory block may be prevented.

The processor 134 may store in the memory 144 a bitmap indicating, for each logical address, which block between the current original block and the copy block is to be accessed in order to alternately access the original block and the copy block. In FIG. 8, the memory block currently being accessed may be referred to as a first access block.

Operations performed in the memory system 110 after the step S808 are described in detail below with reference to FIG. 9.

Figure 9:
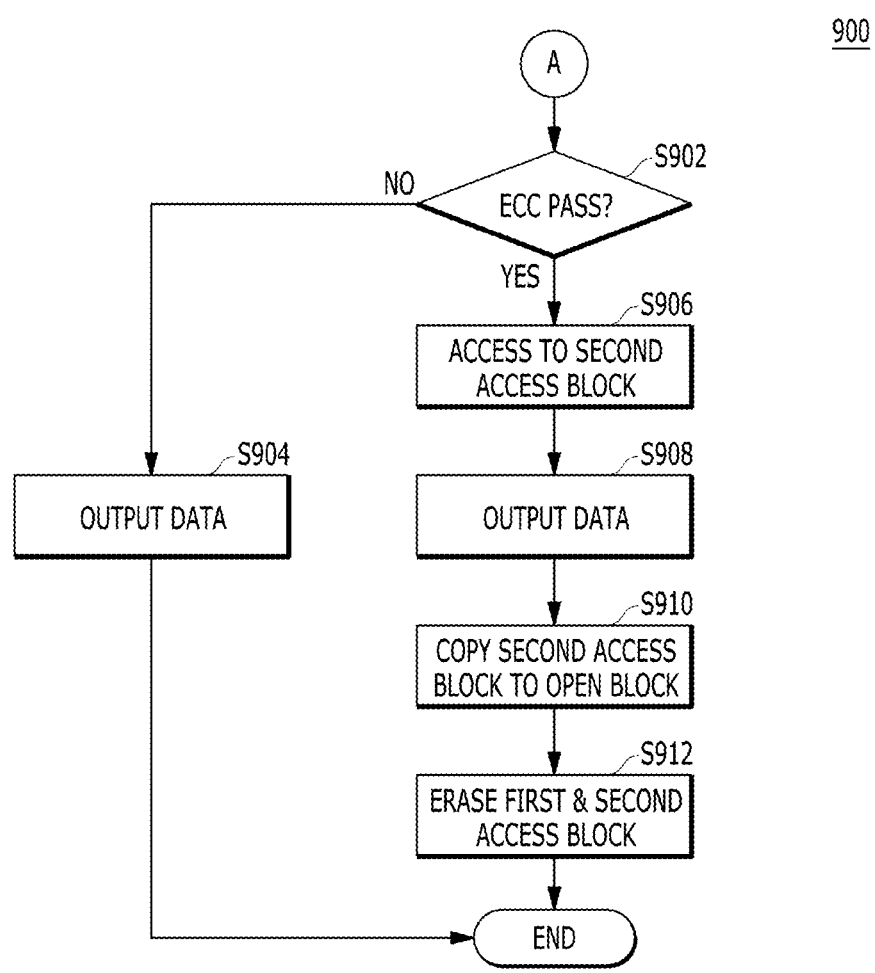

FIG. 9 is a flowchart describing an operation 900 of the memory system 110 in accordance with an embodiment of the present invention. In particular, the operation 900 shown in FIG. 9 follows step S808 of the operation 800 shown in FIG. 8.

In step S902, the ECC 136 may detect and correct an error of data that are read from the first access block.

When the error correction of the data is successful ('Yes' in the step S902), the host interface unit 132 may provide the error corrected data to the host 102 in step S904.

When the error correction of the data fails ('No' in the step S902), the processor 134 may access a second access block in step S906. The second access block may refer to a memory block corresponding to the first access block. For example, when the first access block is the copy block, the second access block may be an original block corresponding to the copy block, and when the first access block is the original block, the second access block may be a copy block corresponding to the original block.

In step S908, the host interface unit 132 may provide data that are read from the second access block to the host 102. In other words, when the data of the first access block are damaged, the memory system 110 may provide the host 102 with data of the second access block that are not damaged.

When data in the first access block is damaged so much that an error correction fails, the processor 134 may generate new original data and copy data by using the undamaged data in steps S910 and S912.

In step S910, the processor 134 may copy valid data of the second access block into an open block as original data. When the open block is changed into a closed block, the processor 134 may generate a copy block by copying the data of the changed closed block into a free block.

In step S912, the processor 134 may erase the first and second access blocks. In an embodiment, the processor 134 may also change the map data associated with the first and second access blocks to instead refer to the new original block and new copy block, remove the copy queue entry associated with the first access block and second access block, and create a new copy queue entry for the new original block and new copy block.

According to an embodiment of the present invention, the controller 130 controlling the memory device 150 may store user data in an original block, and when the original block is changed from an open block to a closed block, the controller 130 may generate a copy block by copying data of each page of the original block into a page of a free block having the same page address.

The controller 130 may compromise between the capacity of the memory system 110 and the reliability of data stored in the memory system 110 by determining the copy level in response to a copy level setting command from the host 102.

The controller 130 may store map data including a logical address, an original block address, a copy block address, and a common page address in the memory device 150. The controller 130 may designate a physical address of the original data and a physical address of the copy data at a lower management cost than a case where the page address of the original data and the page address of the copy data are stored separately in the memory device 150.

When there are an original block and a copy block associated with a read logical address, the controller 130 may prevent read disturbance of each memory block by alternately accessing the original block and the copy block.

According to the embodiments of the present invention, a memory system and a controller may adjust the capacity of the memory system and the reliability of data stored in the memory system according to the selection of a host.

According to the embodiments of the present invention, a memory system and a controller may ensure the reliability of data stored in the memory system at a low management cost.

According to the embodiments of the present invention, a memory system and a controller may reduce read disturbance of data stored in the memory system.

While the present invention has been described with respect to the specific embodiments, it will be apparent to those skilled in the art that various changes and modifications may be made without departing from the spirit and scope of the invention as defined in the following claims.

What is claimed is:

1. A memory system, comprising:
    a memory device including a plurality of memory blocks; and
    a controller configured to control the memory device,
    wherein the controller:
        stores user data in an original block selected among the memory blocks, and
        when the original block becomes a closed block:
            generates a copy block by copying data of each page of the original block into a page having the same page address of a free block among the memory blocks, and stores map data associated with the user data in the memory device,
wherein the map data include a logical address of the user data, an address of the original block, an address of the copy block, and a common page address,
wherein the common page address is a page address which is in common in the original block and the copy block, and
wherein a combination of the common page address and the address of the original block indicates a first page within the original block;
wherein a combination of the common page address and the address of the copy block indicates a second page within the copy block;
wherein both the first page and the second page include valid copies of the user data.

2. The memory system of claim 1, wherein the memory device includes:
a copy queue block configured to queue the original block in response to the original block becoming the closed block, and when a copy block corresponding to the original block is generated, the copy queue block further queues the copy block in correspondence with the original block.

3. The memory system of claim 2, wherein when the memory device is in an idle state, the controller generates a copy block of an original block for which a corresponding copy block has not been generated by referring to the copy queue block.

4. The memory system of claim 2, wherein when the memory system is powered up after a sudden power-off, the controller generates a copy block of an original block for which a corresponding copy block has not been generated by referring to the copy queue block.

5. The memory system of claim 2, wherein the controller determines a copy queue length of the copy queue block based on a copy level setting command from a host.

6. The memory system of claim 5, wherein when the number of original blocks stored in the copy queue block exceeds the copy queue length, the controller:
removes an oldest original block and a copy block corresponding to the oldest original block from the copy queue block,
controls the memory device to erase data of the corresponding copy block, and
removes the copy block address of the user data stored in the corresponding copy block from the map data.

7. The memory system of claim 1, wherein the controller:
detects read map data corresponding to a read logical address from among the map data in response to a read command from a host, and
when the read map data include copy block address information indicating a copy block corresponding to the read logical address:
selects a first access block from among the copy block and an original block corresponding to the read logical address,
acquires user data corresponding to the read logical address from the first access block, and
provides the host with the acquired user data.

8. The memory system of claim 7, wherein the controller alternately selects the first access block between the original block and the copy block whenever a read operation for the read logical address is performed.

9. The memory system of claim 1, wherein the controller:
detects read map data corresponding to a read logical address from among the map data in response to a read command from a host, and
when the read map data include copy block address information indicating a copy block corresponding to the read logical address:
selects a first access block from among between the copy block and an original block corresponding to the read logical address,
acquires first user data corresponding to the read logical address from the first access block,
determines whether the first user data is damaged by performing error detection on the first user data,
in response to determining that the first user data is damaged, acquires second user data from a second access block corresponding to whichever of the original block and the copy block was not selected as the first access block, and provides the host with the second user data.

10. The memory system of claim 9, wherein when the second user data are acquired from the second access block, the controller stores valid data of the second access block in an original block that is selected among the memory blocks and controls the memory device to erase the first and second access blocks.

11. A controller for controlling a memory device, comprising:
a processor configured to:
store user data in an original block of the memory device, and
when the original block becomes a closed block, generate a copy bock by copying data of each page of the original block into a page having the same page address of a free block among free blocks of the memory device; and
a memory configured to store map data that include a logical address of the user data, an address of the original block, an address of the copy block, and a common page address,
wherein the common page address is a page address which is in common in the original block and the copy block, and
wherein a combination of the common page address and the address of the original block indicates a first page within the original block;
wherein a combination of the common page address and the address of the copy block indicates a second page within the copy block;
wherein both the first page and the second page include copies of the user data.

12. The controller of claim 11, wherein the memory includes
a copy queue configured to queue the original block in response to the original block becoming the closed block, and
when a copy block corresponding to the original block is generated, the copy queue further queues the copy block in correspondence with the original block.

13. The controller of claim 12, wherein when the memory device is in an idle state,
the processor generates a copy block of an original block for which a corresponding copy block has not been generated by referring to the copy queue.

14. The controller of claim 12, wherein the processor stores the copy queue in the memory device, and when the controller is powered up after a sudden power-off, the processor generates a copy block of an original block for which a corresponding copy block has not been generated by referring to the copy queue stored in the memory device.

15. The controller of claim 12, wherein the processor determines a copy queue length of the copy queue based on a copy level setting command from a host.

16. The controller of claim 15, wherein when the number of original blocks stored in the copy queue exceeds the copy queue length,
the processor removes an oldest original block and a copy block corresponding to the oldest original block from the copy queue, controls the memory device to erase data of the corresponding copy block, and removes the copy block address of the user data stored in the corresponding copy block from the map data.

17. The controller of claim 11, wherein the processor
detects read map data corresponding to a read logical address from among the map data in response to a read command from a host,
when the read map data include copy block address information indicating a copy block corresponding to the read logical address:
selects a first access block from among the copy block and an original block corresponding to the read logical address,
acquires user data corresponding to the read logical address from the first access block, and
provides the host with the acquired user data.

18. The controller of claim 17, wherein the processor alternately selects the first access block between the original block and the copy block whenever a read operation for the read logical address is performed.

19. The controller of claim 11, wherein the processor:
detects read map data corresponding to a read logical address from among the map data in response to a read command from a host, and
when the read map data include copy block address information indicating a copy block corresponding to the read logical address:
selects a first access block from among between the copy block and an original block corresponding to the read logical address,
acquires first user data corresponding to the read logical address from the first access block,
determines whether the first user data is damaged by performing error detection on the first user data,
in response to determining that the first user data is damaged, acquires second user data from a second access block corresponding to whichever of the original block and the copy block was not selected as the first access block, and provides the host with the acquired second user data.

20. The controller of claim 19, wherein when the second user data are acquired from the second access block,
the processor stores valid data of the second access block in an original block of the memory device and controls the memory device to erase the first and second access blocks.

* * * * *